Patented July 3, 1934

1,965,243

UNITED STATES PATENT OFFICE 1,965,243

COATING, LINING, AND CEMENTING AGENT

Alex Kneip, Frankfort - on - the - Main - Hochst, Germany, assignor to I. G. Farbenindustrie Aktiengesellschaft, Frankfort - on - the - Main, Germany No Drawing. Application July 30, 1931, Serial No. 554,153. In Germany August 2, 1930

5 Claims. (Cl. 106—8)

The present invention relates to coating, lining and cementing agents.

I have found that mixtures of artificial resins capable of being hardened and silicon can be used with great advantage for the manufacture of acid-proof, firmly adherent and heat-conducting coatings and linings and as cementing or binding agents for masonry. Instead of silicon there may be used with the same success the acid-proof silicides, for instance the acid-proof silicides of the heavy metals, such as copper silicide or iron silicide, also silicon carbide. As artificial resins there may be used all the known resins capable of being hardened, for instance phenol-aldehyde resins, resins from polyhydric alcohols and aromatic dicarboxylic acids and urea-formaldehyde resins. The quantity of silicon or of the silicides to be added may vary within wide limits. There is generally used a quantity between 50 per cent. and 300 per cent. calculated upon the quantity of the artificial resin capable of being hardened.

The coatings prepared with these mixtures very firmly adhere to the usual material, such as wood, tissues, glass, enamel, stone, stoneware and to most of the metals and even if the surface of the material is concave. The resistance to acids, organic solvents, atmospheric influences and the like is the same as that of the artificial resins to be used. The thermal conductivity is surprisingly high. The coefficient of heat transmission of a vessel lined with two layers as described in Example 1 is nearly twice as large as that of an enamelled vessel; it is intermediate between that of an unlined vessel and that of a vessel homogeneously lined with lead. This extremely valuable property could not be foretold because, as is known, the artificial resins capable of being hardened constitute very good heat insulators.

The coatings and the like prepared according to the new process furthermore possess a very great hardness, mechanical strength and a sufficient elasticity. Thus, for instance, vessels lined therewith can be quickly heated or cooled without any risk that the coating would crack or split off. Owing to these properties the invention is capable of a large variety of applications, particularly in the construction of chemical apparatus.

The mixtures may be applied in the usual manner on to the articles which have been previously cleaned by a suitable method. They are applied, for instance, with a palette knife, or by spreading, spraying or dipping. The interior surfaces of tubes or other hollow bodies may be coated with the mass by pouring or by the centrifugal process. It is likewise possible to superpose several layers which may, if desired, contain different additions; it is advisable to harden each layer sufficiently before applying the next coating. Instead of applying the finished mixture, the process may also be carried out by first applying the artificial resin and then incorporating the corresponding pulverized silicon or the like into the artificial resin by blowing or spraying. Other known substances, such as kaolin, asbestos, sawdust, titanium dioxide, graphite and the like may also be added, in so far as such additions do not detract from the properties required of the coating or the like. It is likewise surprising that a large quantity of pulverized silicon can be combined with a relatively small quantity of artificial resin so as to obtain enamel-like coatings and the like.

The following examples serve to illustrate the invention, but they are not intended to limit it thereto, the parts being by weight:

1. For the preparation of enamel-like linings the interior surface of a vessel or the like made of wrought-iron, cast iron, copper, aluminium or another metal is freed from the layer of oxide by means of a sand blast apparatus and then coated with a mixture consisting of 55–60 parts of silicon or silicides, 40–45 parts of a liquid condensation product of phenol formaldehyde of about 80 per cent. strength. The proportion of silicon and artificial resin may be varied. The mixture can be applied very uniformly by means of a spraying pistol. In order to render the mixture suitable for being used in the spraying pistol, there are added about 10–15 per cent. of a solvent, such as alcohol, acetone, and the like. If the mixtures are to be applied by means of a brush or according to another process, the addition of the solvent can be dispensed with. The coating is hardened in a furnace, or, if available, in a heating jacket or by blowing hot air onto the coating and in case of tubes and the like into them. It has been found useful to carry out the hardening process in several stages, in a first stage at a temperature of about 100° C. and then in a final stage at a temperature corresponding to the purpose for which the articles are intended to be used, for instance at 160° C.–180° C. The process may be repeated. A coating may likewise be applied in the same manner on the outer surface of a vessel or the like. The coefficient of heat transmission of a steam jacket vessel thus lined internally with a double layer was found to be 1000 cal. m²h o. C. in comparison to 1200 cal. in the case of an unlined iron vessel, 800 cal. in the case of a vessel homogeneously lined with lead and 550 cal. in the case of an enamelled vessel.

2. Damaged enamelled apparatus or parts of apparatus, such as stirrers, vessels and the like, the enamel of which has split off partly or totally, can be rendered serviceable again by coating the damaged parts with one of the mixtures mentioned in Example 1 and then hardening the coating. The outer surface of damaged enamelled dishes, as they are used in laboratories, can be repaired or completely coated with one of the said mixtures. Owing to the good thermal conductivity of the coating after hardening, the dishes thus treated can be heated, when filled, with the direct flame without charring the outer coating.

3. Heating plates or heating grates of drying chests are coated once or several times with one of the mixtures mentioned in Example 1. The acid-proof and heat-conducting coatings obtained after the hardening prevent rusting of the heating device when it is used for drying acid products and hence contamination of the products caused by the rust. The hardening may be caused by directly heating the heating device with steam. Any other heating devices or drying chests can likewise be rendered resistant to corrosion.

Apparatus or parts of apparatus, such as thermometer tubes, boiling and rising tubes, stirrers, covers, heating- and cooling coils are protected by a coating or a lining according to the new process against corrosion by acids, salts, acid chlorides and the like. When protecting stirrers, rising tubes and the like, it is likewise possible to use also tissues, bandages and the like which are impregnated with artificial resin or a mixture of silicon and artificial resin and then wound round the object in question which may also be pretreated.

4. A vessel is lined with an acid-proof and heat-conducting masonry by cementing suitable stones or plates to the wall of the vessel and to one another by means of a mixture of, for instance 70-75 percentage by weight of a high-percent iron silicide and 25-30 parts of artificial resin capable of being hardened. The vessel may receive a coating as described in Example 1 before it is lined with the stones or plates.

In combination with heat-conducting, acid-proof burnt silicon stones or shaped bodies from artificial resin and silicon or silicides respectively, there is obtained according to the new process a perfectly ideal masonry, particularly on account of the fact that owing to the absolutely tight joints and the extremely great binding power of the cement to iron as well as to stone only one layer of stones is required whereas two layers are necessary in most cases if porous water glass cementing compositions are used.

5. Damaged ceramic ware, such as pipes, cocks and the like are coated at the fracture with one of the said mixtures, the pieces are fitted together and hardened. They are thus rendered fit for re-use.

6. Reservoirs, iron gutters and pipes are protected against corrosion by lining or coating them according to the new process.

7. To apparatus in which the washing liquids containing sulfur compounds produced during the purification of gas are decomposed with acids, a coating is applied containing phenol aldehyde resins and silicon. The decomposition of the washing liquids mentioned above which may contain sulfite, bisulfite, thiosulfate, polythionate and ammonium thiocyanate (the latter in case the gas should contain hydrocyanic acid) is associated with difficulty in operation on a large scale because the apparatus are exposed to a great chemical stress. By a coating from phenol aldehyde resins containing silicon, it is possible to protect the apparatus against chemical attacks even if they are exposed to a temperature above 200° C. and to increased pressure.

In the following claims the term "silicon" is intended to cover also the equivalents of silicon: the acid-proof silicides.

I claim:

1. As a new composition of matter a coating, lining and cementing agent comprising silicon and a phenol-formaldehyde resin capable of being hardened.

2. As a new composition of matter a coating, lining and cementing agent comprising a phenol-formaldehyde resin capable of being hardened and 50-300 per cent. silicon calculated upon the phenol-formaldehyde resin.

3. As a new composition of matter a cementing agent comprising a hard filling agent of the group consisting of silicon, the silicides of the heavy metals and silicon carbide and an artificial resin of the group consisting of the phenol-aldehyde resins, the resins from polyhydric alcohols and aromatic dicarboxylic acids and the urea formaldehyde resins capable of being hardened.

4. As a new composition of matter a coating, lining and cementing agent comprising silicon, a phenol-formaldehyde resin capable of being hardened and a soft filling agent.

5. As a new composition of matter a coating, lining and cementing agent comprising silicon, a phenol-formaldehyde resin capable of being hardened and asbestos.

ALEX KNEIP.